United States Patent [19]

Chuang et al.

[11] Patent Number: 5,851,948
[45] Date of Patent: Dec. 22, 1998

[54] SUPPORTED CATALYST AND PROCESS FOR CATALYTIC OXIDATION OF VOLATILE ORGANIC COMPOUNDS

[75] Inventors: Karl T. Chuang; Mingqian Zhang; Bing Zhou, all of Edmonton, Canada

[73] Assignee: Hydrocarbon Technologies, Inc., Lawrenceville, N.J.

[21] Appl. No.: 700,201

[22] Filed: Aug. 20, 1996

[51] Int. Cl.$^6$ ................ B01J 23/00; B01J 8/00; A62D 3/00

[52] U.S. Cl. ............ 502/314; 502/304; 502/316; 502/318; 502/320; 502/327; 502/331; 502/333; 502/334; 423/245.3; 423/245.1; 588/205; 588/206; 588/207

[58] Field of Search ................ 502/304, 313, 502/314, 316, 318, 320, 326, 327, 331, 332, 334, 336, 338, 339, 346, 333; 423/245.3, 245.1; 588/205, 206, 207

[56] References Cited

U.S. PATENT DOCUMENTS

| | | | |
|---|---|---|---|
| 4,119,568 | 10/1978 | Nishida et al. | 52/319 |
| 4,892,664 | 1/1990 | Miller | 210/747 |
| 5,009,872 | 4/1991 | Chuang et al. | 423/245.3 |
| 5,057,206 | 10/1991 | Engel et al. | 208/143 |
| 5,190,668 | 3/1993 | Chuang | 210/750 |
| 5,276,249 | 1/1994 | Greene et al. | 588/206 |
| 5,414,201 | 5/1995 | Greene | 588/206 |
| 5,457,268 | 10/1995 | Greene et al. | 588/207 |

*Primary Examiner*—Glenn Caldarola
*Assistant Examiner*—In Suk Bullock
*Attorney, Agent, or Firm*—Fred A. Wilson

[57] ABSTRACT

A catalyst for effective oxidation of volatile organic compounds (VOCs) includes 0.010–2 wt. % of a noble metal such as platinum in combination with 0.5–15 wt. % of a transition metal oxide such as chromium oxide ($Cr_2O_3$), with at least the noble metal being deposited as a thin outer layer or shell not exceeding 0.10 mm thickness on a porous inert support such as alumina or silica having surface area of 10–400 $m^2/g$. The catalyst is made by adding the transition metal oxide such as chromium oxide ($Cr_2O_3$) to the support material particles, and then subsequently mixing a solution of ammonium platinum nitrate with a suitable carrier liquid so as to form a "cluster" structure on the support material and which limits penetration of the active noble metal into the porous support, then drying, reducing, and calcining the metals-loaded support material. This catalyst composition and structure is highly effective for the oxidative destruction of VOCs in vapor form at concentrations of 1 ppm—5 vol. % and at reaction temperatures of 50°–500° C., 0–600 psig pressure, and space velocity of 1000–200,000 $hr^{-1}$ to produce essentially only carbon dioxide and water products.

16 Claims, No Drawings

SUPPORTED CATALYST AND PROCESS FOR CATALYTIC OXIDATION OF VOLATILE ORGANIC COMPOUNDS

BACKGROUND OF INVENTION

This invention pertains to catalytic oxidation of volatile organic compounds (VOCs) at relatively low temperatures and including such compounds which contain water vapor. It pertains particularly to the catalytic oxidation of such components utilizing a catalyst containing small concentrations of a noble metal such as platinum and a metal oxide such as chromium oxide provided in a thin outer layer on an inert porous support material such as alumina, which catalyst is effective for low temperature deep oxidation of the volatile organic compounds in vapor phase and in the presence of water vapor.

Vapor phase volatile organic compounds (VOCs) are emitted from various commercial and industrial processes and are a significant source of air pollution due to their direct and secondary (e.g. photochemical smog) environmental effects. Various clean-up technologies are known and widely used today for treatment of these vapor phase emissions. Thermal combustion and physical reversible adsorption processes, coupled with VOC recovery, are cost effective when the concentration of the pollutants is relatively high. Catalytic oxidation is useful to eliminate vapor phase organics at low concentrations. The advantages of catalytic oxidation as compared with other technologies are its higher efficiency, lower reaction temperatures, lower capital cost and less emission of secondary pollutants into the atmosphere. Effective catalytic oxidation of VOCs requires a highly effective catalyst. With low concentrations of VOC material in most gas streams and for large volumes of gases to be heated, a catalyst which is highly active at relatively low temperature can provide significant cost saving for VOC clean-up.

Supported precious metal catalysts in either monolith or pellet forms are known oxidation catalysts having high activity and stability and are widely used for various gas phase VOC emission control needs. However, the high cost of precious metals such as platinum and the catalyst sensitivity to some poisons such as sulfur and halogen—containing components have motivated the search for effective dispersions of noble metals and poison—resistant alternatives for such oxidation catalysts. Transition metal oxide catalysts, although generally less active than the noble metal catalysts, have also been studied and used for the deep oxidation of VOCs because of their advantage of lower cost. Although some catalysts have been disclosed for removal of various VOCs from specific emission sources, such catalysts usually contain undesirably high percentage loadings of either a precious metal or metal oxides as an active component and require undesirably high operating temperature.

Some catalytic processes for removing volatile organic compounds (VOCs) from gaseous or wastewater streams are also generally known. For example, U.S. Pat. No. 4,892,664 to Miller discloses a catalytic system for removing volatile organic compounds from wastewater using a supported platinum catalyst. U.S. Pat. No. 5,009,872 to Chuang et al discloses a method for catalytically removing volatile organic compounds from moisture-containing gaseous process streams by utilizing a catalyst including a hydrophobic support and a catalytically active metal. U.S. Pat. No. 5,190,668 to Chuang discloses a catalytic method for removal of volatile organic compounds contained in water by contacting the vapor containing VOCs with a catalyst containing noble metal such as platinum on a hydrophobic support at 20°–180° C. reaction temperature. U.S. Pat. No. 5,414,201 to Greene discloses a process which utilizes a sorbent/catalyst composition, such as a metal-exchanged aluminosilicate zeolite or metal-impregnated aluminosilicate zeolite for sequential adsorption and oxidation of halogenated organic compounds at oxidation temperatures of 150°–600° C. Also, U.S. Pat. No. 5,276,249 and U.S. Pat. No. 5,457,268 to Greene et al discloses selective oxidation catalysts for oxidative destruction of halogenated organics using as catalysts metals-exchanged or metals-impregnated zeolites. However, further improvements in such catalysts and processes for effective deep oxidation of volatile organic compounds at relatively low temperature are desired.

SUMMARY OF INVENTION

It is an object of the present invention to provide a novel catalyst composition and structure which is highly effective for oxidative destruction of volatile organic compounds at relatively low temperatures. For this catalyst, the active metal(s) are provided as only a thin outer layer or shell on a porous support material.

It is another object of this invention to provide a method for making the catalyst so that an active noble metal and a selected metal oxide are deposited on a porous support material so that at least the active noble metal is provided in a very thin outer layer or shell, so as to minimize mass transfer resistance for the volatile organic compound feedstream and thereby lower the active metal requirement for the catalyst. This catalyst structure also maximizes contact of the active metal(s) with the volatile organic compounds contained in the feedstreams.

It is a further object to provide a process for effectively utilizing this improved catalyst for oxidizing gaseous volatile organic reactant compounds at relatively low reaction temperatures and at high space velocity conditions to produce essentially only carbon dioxide and water products, even under humid conditions.

These objects are achieved according to a first aspect of the invention by providing an improved catalyst composition and structure for the oxidative destruction of volatile organic compounds (VOCs) present in feedstreams in vapor form at relatively low reaction temperature and pressure conditions. The catalyst comprises:

- an inert porous support material having total surface area of about 10–400 $m^2/g$;
- a noble metal selected from the group consisting of palladium, platinum, rhodium and ruthenium in a concentration of 0.010–2.0 wt. % of the catalyst, the metal being provided as a very thin outer layer having thickness of 0.005–0.10 mm. on only the outer surface of the support material; and
- a transition metal oxide selected from the metals group consisting of chromium, cobalt, copper, cerium and iron in concentration of 0.5–15 wt. % of the catalyst also provided on the support material, with at least the noble metal being provided as the thin layer or shell structure on only the outer surface of the porous support material.

For the catalyst composition and structure according to this invention, it has been discovered that a complex interaction exists between the porous support material such as alumina or silica in particle form, the thin outer shell of the noble metal such as palladium, platinum, rhodium and ruthenium and the metal oxide such as oxides of chromium, cobalt, copper, cerium and iron, each being selectively deposited on the support material outer surface. This catalyst composition and its unique structure provides significant high activity for the oxidative destructive of gaseous volatile organic compounds such as acetates, alkanes, alkenes, alcohols, aldehydes, aromatics, carboxylic acids, ketones, and halogenated hydrocarbons as compared to the activity of known Pt/alumina catalyst compositions, even when the VOC gaseous feedstream contains water vapor. Useful catalyst particle diameters are 1–10 mm and are preferably 2–8 mm. diameter. Preferred characteristics for the catalyst of this invention are support material surface area of 50–350 $m^2/g$; platinum concentration of 0.012–1.0 wt. % of the catalyst and provided in a thin outer shell having thickness of 0.01–0.08 mm, and chromium oxide concentration of 1–10 wt. % of the catalyst.

This invention also includes methods for making the catalyst so that it advantageously requires only minimal amounts of the expensive noble metal such as platinum which is provided in a thin outer layer or shell on the catalyst support particles, together with a selected transition metal oxide, so that the resulting catalyst minimizes mass transfer resistance for the volatile organic compounds in the feedstream and exhibits high catalytic activity for the oxidative destruction of VOCs even in the presence of water vapor. The method for making the catalyst comprises the steps of:

(a) providing an aqueous solution of a metal oxide, such as chromium nitrate, adding the aqueous solution to a porous support material having surface area of 10–400 $m^2/g$ such as alumina or silica, drying the metal loaded support material, and then calcining it in air;

(b) mixing ammonium platinum nitrate aqueous solution containing 0.12–4.0 wt. % platinum in an aqueous solution of an alcohol carrier liquid such as ethanol, methanol or isopropanol, and forming a second solution;

(c) adding the second solution to the porous support material particles previously loaded with the metal oxide, such as chromium oxide so that discrete "clusters" are formed in the carrier solution and on the support particles and restrict the diffusion of the platinum into the inner portions of the catalyst support material; and (d) drying the loaded support material at 80°–110° C. temperature, reducing the metals in the dried support material in a $H_2/N_2$ gas mixture at 300°–400° C., and then calcining the loaded support material particles in air at 300°–650° C. to produce the catalyst.

This method for making the catalyst results in at least the active noble metal such as platinum being provided in a thin outer layer or shell on the catalyst support material, while the previously applied transition metal oxide selected from the group consisting of chromium, cobalt, copper, cerium, and iron may penetrate somewhat further into the porous support material.

This invention further provides a process for utilizing the catalyst having its active metals provided in only the very thin outer shell on the catalyst particles for effective oxidation of volatile organic compounds (VOCs). In the process aspect of this invention, a feedstream containing one or more volatile organic compounds (VOCs) including but not limited to acetates, alkanes, alkenes, alcohols, aldehydes, aromatics, carboxylic acids, ketones, and halogenated hydrocarbons in gaseous form at concentrations between 1 ppm and 5 vol. % is mixed with an oxygen-containing gas such as air. The resulting feed gas mixture is then contacted with the oxidation catalyst in a reactor maintained at broad reaction conditions of 50°–500° C. temperature, 0–600 psig pressure, and space velocity of 1000–200,000 $h^{-1}$. The volatile organic compound(s) contained in the feedstream in vapor form is (are) effectively oxidized during its (their) contact with the catalyst containing only small concentrations of an active noble metal such as platinum and a metal oxide such as chromium oxide provided in a thin layer or shell on only the outer surface of the catalyst particles, so as to yield essentially only carbon dioxide and water products. Preferred reaction conditions for the gaseous VOC feedstream are 100°–400° C. temperature, 0–30 psig pressure, and space velocity of 3000–100,000 $h^{-1}$.

DESCRIPTION OF INVENTION

For the catalyst composition according to this invention, it has been unexpectedly discovered that the catalyst can have high activity for oxidative destruction of volatile organic compounds (VOCs) even when the active noble metal such as platinum is provided on the support material in only a very thin outer layer or "egg shell" structure having thickness of only 0.005–0.10 mm (0.0002–0.004 inch). It has been found that a complex interaction occurs between the noble metal and a metal oxide with the organic feed compounds on the catalyst surface. By providing at least the active noble metal component in only the very thin outer layer without any significant penetration into the inner pores of the catalyst support material, only minimal amounts of the expensive noble metal are needed for providing a highly active catalyst for effective oxidation of volatile organic compounds in feedstreams at relatively low reaction temperatures of 50°–500° C. and at high space velocities up to about 200,000 $h^{-1}$.

Method of Making the Catalyst: The novel catalyst composition and structure according to this invention is produced by utilizing method steps by which the active noble metal and transition metal oxides are both added to the support material, but at least the active noble metal such as platinum is restricted to being located in only a thin outer layer or shell on the support material. This small thickness for the active noble metal layer or shell is influenced by the flow characteristics of the noble metal salt and a suitable carrier liquid solution of an alcohol and water, the porosity and surface area of the support material, and the diffusion rate of the active metal carrier liquid solution into the porous support material. The flow characteristics of the active metal solution in the alcohol-water carrier liquid having low surface tension is controlled so as to initially form a "cluster"-type structure of the active metal in the carrier liquid on only the outer surface of the support material. Such "cluster" type structures are formed because of valence differences between ions of the active noble metal such as platinum and molecules of the alcohol carrier liquid, and such larger "clusters" effectively impede penetration of the active metal into smaller size pores of the support material. During the subsequent drying, reducing and calcining steps for making the catalyst, the carrier liquid is destroyed and removed so that only the active metal remains in uniformly dispersed sites in the thin outer "egg-shell" structure having 0.005–0.10 mm thickness on the support material. Suitable alcohol carrier liquids may include ethanol, methanol and isopropanol, with isopropanol usually being preferred.

This special technique of depositing an active noble metal such as platinum in a thin layer or shell on only the outer surface of the support material advantageously provides a high localized concentration of the noble platinum metal on the catalyst outer surface, where it is readily contacted by the volatile organic compounds in the feedstream. This location for the active metal(s) for the catalyst is more advantageous than if the active metals are provided within a zeolite-type support structure. Such improved contacting of the VOCs feedstream with the active metal(s) in the catalyst results in more effective catalyst oxidative destruction of the gaseous volatile organic compounds in the feedstream, even at relatively low temperatures and high space velocities.

The selected transition metal oxide is provided on the porous support material by mixing an aqueous salt solution of the metal oxide with the support material prior to the deposition of the thin noble platinum metal layer thereon. The metal oxide addition requires utilizing drying, reducing and calcining steps, similar to those subsequently required for providing the thin platinum layer or shell on the support. This procedure for making the catalyst advantageously limits the quantity of the expensive noble active metal needed and used for the catalyst while maintaining its high catalytic activity, and appreciably reduces the cost of making the catalyst.

Suitable drying for the metal-loaded support material is achieved at 50°–150° C. temperature for at least about 8 hours, followed by reducing the dried metals in a hydrogen/nitrogen gas mixture at 100°–800° C. for at least about 4 hours, and then calcining the loaded support material in air at 200°–700° C. for at least 3 hours. The catalyst porous support material is usually provided as particles having diameter of 1–20 mm with particle diameter of 2–8 mm. being preferred. Also if desired, the active noble metal such as platinum can be combined with a hydrophobic material such as fluorinated carbon powder and coated onto an inert support material such as ceramic shapes.

Process For Utilizing the Catalyst: Because of the increased activity of the catalyst of this invention for catalyzing deep oxidation of volatile organic compounds (VOCs), even when the gaseous feedstreams contain water vapor, lower reaction temperatures are required than for other known oxidation catalysts. The process is useful for oxidative destruction of various volatile organic compounds contained in gaseous feedstreams at concentrations between 1 ppm and 5 vol. % in the feedstream. Such volatile organic compounds may include but are not limited to acetates, alkanes, alkenes, alcohols, aldehydes, aromatics, carboxylic acids, heptane, ketones, and halogenated hydrocarbons. Broad useful reaction conditions for such VOCs are 50°–500° C. temperature, 0–600 psig. pressure, and space velocity of 1000–200,000 $h^{-1}$ to yield essentially only carbon dioxide and water products. Preferred reaction conditions are 100°–400° C. temperature, 0–100 psig pressure, and space velocity of 3000–100,000 $h^{-1}$.

The catalyst of this invention will be further described with the aid of the following examples, which should not be construed as limiting the scope of the invention.

EXAMPLES

Several catalyst samples were produced according to this invention and tested for their catalytic activity for oxidative destruction of various VOC materials. The catalytic activity for the various catalyst compositions were determined by using a glass U-shaped fixed-bed reactor (15 mm i.d.) operated in a continuous mode at atmospheric pressure. The reaction temperature was monitored by two thermocouples installed at the bottom and top of the catalyst bed, and was controlled within ±1° C. The volatile organic compounds in an air stream were introduced by passing sampling air through a VOC saturator at ambient temperature, or in an ice-bath when necessary. The gas lines before and after the reactor were heated by electrical tapes to prevent possible condensation of VOCs in the feedstream. The flow rates of both the air feedstream and the sampling air were controlled by mass flow controllers so that different VOC concentrations could be obtained by varying the sampling air flow rate. The feed gas and the effluent gas were directed to an on-line gas chromatograph equipped with a flame ionization detector. A 2.5 ft length×⅛ in. diameter stainless steel column packed with Porapak Q material was employed for the separation and analysis of VOCs. The quantitative determination of VOC concentration was performed by calibrating VOCs using a gas mixture of known composition.

The catalytic activities of the catalysts were measured by using 10 g of each catalyst in the fixed bed reactor at a space velocity of 5000 $h^{-1}$, and in a range of temperatures from 130° C. to 350° C., at which conditions homogeneous oxidation of VOCs was found to be negligible. The initial concentration of VOC in the air feedstream was 200 ppm for benzene, heptane, and dichloromethane, and 280 ppm for acetone. In all cases, $CO_2$ and $H_2O$ were the only products; except for dichloromethane where HCL is also produced; no CO or partial oxidation products were detectable. The VOC destruction efficiency of the catalyst was determined by the following equation:

$$VOC\ Destruction\ \% = \frac{(C_{in} - C_{out})}{C_{in}} \times 100$$

where:

$C_{in}$ is VOC concentrations in the reactor inlet stream, and $C_{out}$ is VOC concentration in the outlet stream.

Example 1

Preparation of Platinum/Alumina Catalyst 3.75 ml of ammonium platinum nitrate aqueous solution containing 0.12% of platinum was added to a solution containing 5 ml of isopropanol and 14.8 ml of distilled water. The resulting solution was added to 30 g of gamma-alumina spheres (3 mm diameter having BET surface area 320 $m^2/g$). The mixture was rotated and evaporated at about 80° C. for 5 h, and was further dried at 105° C. for 16 h. The catalyst was then reduced in $H_2/N_2$ gas mixture at 350° C. for 10 h, and calcined in air at 350° C. for 3 h. The resulting catalyst is referred to as Catalyst 1 in Table 1.

Additional Pt/alumina catalysts (Catalysts 2 to 4) with higher platinum loadings were prepared following the above procedure. By using ammonium platinum nitrate aqueous solution containing either 0.12% or 4% of platinum, a 22.5 ml of isopropanol-water solution with different amount of platinum was made to impregnate 30 g of the alumina spheres. Each of these additional catalysts was reduced and calcined as described above. The compositions and activities of these catalysts are provided in Table 1 for oxidation of benzene and heptane feeds at 150°–250° C. temperature and 5000 $h^{-1}$ space velocity.

TABLE 1

Oxidation of Benzene and Heptane over Pt/Alumina Catalysts

| Catalyst No. | Pt Content, wt % | Benzene Destruction, wt. % | | Heptane, Destruction, wt. % | |
|---|---|---|---|---|---|
| | | 150° C. | 175° C. | 175° C. | 250° C. |
| 1 | 0.015 | 63.6 | 89.2 | 60.4 | 73.4 |
| 2 | 0.045 | 84.0 | 95.1 | 76.2 | 87.3 |
| 3 | 0.10 | 90.7 | 98.0 | 82.7 | 90.9 |
| 4 | 0.20 | 95.4 | 99.0 | 85.9 | 92.7 |

These results show that the VOC destruction efficiency of the catalysts is high even at relatively low Pt loadings which do not exceed 0.20 wt %, and that the destruction efficiency increases with increased platinum loading and reaction temperature. In contrast, commercially available catalysts used for similar VOC destruction operations contain increased platinum loading of at least 0.5 wt % Pt.

Example 2

Preparation of Pt-Metal Oxide/Alumina Catalyst 6.0 g of chromium nitrate ($Cr(NO_3)_3 \cdot 9H_2O$) was dissolved in 22.5 ml of distilled water, and the solution was added to 30 g of gamma-alumina spheres. This mixture was rotated and evaporated at about 80° C. until it was superficially dry. The resulting alumina solids were further dried at 105° C. for 16 h, and calcined in air at 450° C. for 4 h.

3.75 ml of ammonium platinum nitrate aqueous solution containing 0.12% of platinum was added to a solution containing 5 ml of isopropanol and 14.8 ml of distilled water. The above chromium oxide containing alumina spheres were impregnated with this platinum-alcohol solution. The resulting mixture was rotated and evaporated at about 80° C. for 5 h, and was further dried at 105° C. for 16 h. The catalyst was then reduced in $H_2/N_2$ gas mixture at 350° C. for 10 h and calcined in air at 350° C. for 3 h. The catalyst is designated to Catalyst 5 in Table 2.

Additional Pt-$Cr_2O_3$/Alumina catalysts (Catalyst 6 to 12) with varying platinum and chromium loadings were prepared following the above procedure. The compositions and activities of these catalysts are compared in Table 2 below.

TABLE 2

Activity of Pt/Alumina and Pt-$Cr_2O_3$/Alumina Catalyst for Benzene and Heptane Oxidation (Space Velocity = 5000 $h^{-1}$)

| Catalyst No. | Catalyst Composition, wt. % | | Benzene Destruction, wt. % | | Heptane Destruction, wt. % | |
|---|---|---|---|---|---|---|
| | Pt | $Cr_2O_3$ | 150° C. | 175° C. | 175° C. | 250° C. |
| 1 | 0.015 | 0 | 63.6 | 89.2 | 60.4 | 73.4 |
| 5 | 0.014 | 3.7 | 88.5 | 100 | 78.1 | 100 |
| 6 | 0.035 | 3.7 | 97.7 | 100 | 88.7 | 100 |
| 7 | 0.060 | 3.7 | 100 | 100 | 98.5 | 100 |
| 8 | 0.100 | 3.7 | 100 | 100 | 100 | 100 |
| 9 | 0.014 | 0.8 | 33.6 | 86.9 | 69.3 | 99.1 |
| 10 | 0.014 | 2.2 | 88.7 | 100 | 76.3 | 100 |
| 11 | 0.014 | 5.4 | 81.1 | 100 | 76.7 | 100 |
| 12 | 0.014 | 7.1 | 47.9 | 99.5 | 75.4 | 100 |

By comparing the activities of these catalysts containing Pt/$Cr_2O_3$ with catalysts of similar platinum loading as described in Example 1, it is seen that the catalytic destruction activities are generally higher than for the Pt/alumina catalysts of Example 1. Thus, adding selected amounts of chromium oxide to the Pt/alumina catalyst significantly improves its VOC destruction efficiency. Also, the benzene and heptane destruction for the Pt-$Cr_2O_3$/alumina catalyst is much higher than that for the Pt/alumina catalyst with similar Pt loading.

Specifically, the data presented in Tables 1 and 2 show that Pt only catalysts (Catalysts 1–4 in Table 1) provide high activity for the oxidation of benzene and n-heptane at temperatures below about 200° C. Adding 0.8–7.1 wt % chromium oxide ($Cr_2O_3$) to Pt/alumina (Catalysts 5–12 in Table 2) significantly improves its ability to oxidize benzene and heptane, as evidenced by the substantially higher benzene and heptane destruction on the Pt-$Cr_2O_3$/alumina catalysts than on the Pt/alumina catalyst with similar platinum loading. It is noted that the optimum range of $Cr_2O_3$ loading in the catalyst is in the range of 2 to 5 wt. %.

Example 3

Effect of Calcination Temperature for Chromium Oxide Catalyst

Example 2 was repeated, except that the calcination of the dried chromium nitrate containing alumina was carried out at 350° C. and at 650° C., respectively, instead of at 450° C. The resultant solid was impregnated with the platinum-containing isopropanol-water solution, then dried, reduced in $H_2/N_2$ gas, and calcined in air as described in Example 2. The thus obtained catalysts were designated as Catalyst 13 (calcined at 350° C.) and Catalyst 14 (calcined at 650° C.), respectively. This example 3, when compared to Example 2 (Catalyst 5), demonstrates the influence of calcination temperature for the chromium oxide precursor, as shown in Table 3. Calcination of the catalyst at 450° C. results in improved VOC destruction efficiency.

TABLE 3

Impact of Calcination Temperature for Chromium Oxide (Pt loading = 0.014%; $Cr_2O_3$ loading = 3.7 wt. %)

| Catalyst No. | Calcination Temperature, °C. | Benzene Destruction, wt. % | |
|---|---|---|---|
| | | 150° C. | 175° C. |
| 13 | 350 | 77.1 | 100 |
| 5 | 450 | 88.5 | 100 |
| 14 | 650 | 39.4 | 61.3 |

Example 4

Impact of Hydrogen Reduction Step

The catalyst procedure of Example 2 was followed except that a metals reduction step in $H_2/N_2$ gas was not provided. The platinum and chromium oxide containing alumina was simply calcined at 350° C. in air for 3 h. The resulting catalyst is designated as Catalyst 15 in Table 4 below. This example 4, in comparison with Example 2 (Catalyst 5), demonstrates that the reduction step in $H_2/N_2$ gas is necessary for the formation of highly active catalysts for effective oxidation of VOCs.

TABLE 4

Impact of Hydrogen Reduction Step
(Pt loading = 0.014%, $Cr_2O_3$ loading = 3.7%)

| Catalyst No. | $H_2/N_2$ Reduction | Benzene Destruction, wt. % | | Heptane Destruction, wt. % |
|---|---|---|---|---|
| | | 150° C. | 175° C. | 175° C. |
| 5 | YES | 88.5 | 100 | 78.1 |
| 15 | NO | 22.5 | 85.9 | 58.3 |

Example 5

Impact of Catalyst Metal Impregnation Procedure on Catalyst Activity

A catalyst No. 16 was prepared by using the following procedure. 3.6 g of chromium nitrate ($Cr(NO_3)_3 \cdot 9H_2O$) was added into 19.0 ml of distilled water. After completely dissolving, 3.7 ml of ammonium platinum nitrate aqueous solution containing 0.12 wt. % of platinum was also added to the chromium nitrate solution. The resulting solution containing both chromium and platinum was added to 30 g of gamma-alumina spheres. The mixture was rotated and evaporated at about 80° C. for 5 h, and was further dried at 105° C. for 16 h. The catalyst was then reduced in $H_2/N_2$ gas at 350° C. for 10 h, and calcined in air at 350° C. for 3 h.

This catalyst No. 16, when compared with catalyst 10 in example 2 shown in Table 5 below having the same metals content, demonstrates that sequential-impregnation procedure rather than co-impregnation of the platinum and chromium oxide onto alumina support is critical for the formation of highly active catalyst for oxidation of VOCs.

TABLE 5

Impact of Metals of Impregnation Procedure on Benzene Destruction
(0.014% Pt and 2.2% $Cr_2O_3$ on alumina)

| | Benzene Destruction, wt. % | |
|---|---|---|
| Catalyst No. | 150° C. | 175° C. |
| 10 | 88.7 | 100 |
| 16 | 28.1 | 45.3 |

Example 6

Various Pt—Metal Oxides/Alumina Catalysts

A series of other catalysts were preferred in which the chromium oxide was replaced by other reducible metal oxides including $Co_2O_3$, CuO, $Fe_2O_3$, NiO and $CeO_2$ in the same manner as for Example 2, but using instead of chromium nitrate, 10.9 g of $Co(NO_3)_3 \cdot 6H_2O$, 9.1 g of $Cu(NO_3)_2 \cdot 3H_2O$, 15.2 g of $Fe(NO_3)_3 \cdot 9H_2O$, 23.4 g of $Ni(NO_3)_2 \cdot 6H_2O$, 15.1 g of $Ce(NO_3)_3 \cdot 6H_2O$, each dissolved in 22.5 ml of distilled water, respectively. After impregnating 30 g of alumina particles with each solution, each individual solid sample was dried and calcined as described in Example 2. The metal oxide containing gamma-alumina was then impregnated with ammonium platinum nitrate isopropanol-water solution, then dried, reduced, and calcined as described in Example 2. The compositions of these catalysts and their catalytic activities for acetone and dichloromethane destruction are provided below in Tables 6, and for benzene destruction are provided in Table 7.

TABLE 6

Impact of Different Metal Oxides on Acetone & Dichloromethane Destruction (0.014 wt. % Pt on Alumina)

| | Acetone Destruction wt. % | | Dichloromethane Destruction, wt. % | |
|---|---|---|---|---|
| Catalysts | 175° C. | 250° C. | 250° C. | 350° C. |
| Pt* | 70.1 | 92.0 | 23.2 | 75.5 |
| Pt-6.6% $Cr_2O_3$ | 87.1 | 100 | 51.7 | 91.4 |
| Pt-9.1% CuO | 79.7 | 99.2 | 55.0 | 92.0 |
| Pt-9.4% $Co_2O_3$ | 70.1 | 97.4 | 50.7 | 86.8 |

*0.015% Pt on Alumina

TABLE 7

Impact of Different Metal Oxides on Benzene Destruction
(0.014 wt. % Pt on Alumina)

| | Benzene Destruction, wt. % | |
|---|---|---|
| Catalysts | 150° C. | 175° C. |
| Pt-3.7% $Cr_2O_3$ | 88.5 | 100 |
| Pt-9.1% CuO | 11.8 | 23.2 |
| Pt-16.7% NiO | 4.7 | 13.4 |
| Pt-9.1% $Fe_2O_3$ | 21.0 | 46.9 |
| Pt-16.6% $CeO_2$ | 17.8 | 47.5 |
| Pt-9.4% $Co_2O_3$ | 19.3 | 58.4 |

The results provided in Tables 6 and 7 show that addition of the metal oxides such as CuO, $Co_2O_3$ etc. to Pt/alumina can appreciably improve its ability to oxidize acetone and dichloromethane (Table 6), but dramatically inhibits its ability to oxidize benzene (Table 7). Of particular interest is the addition of $Cr_2O_3$ to Pt/alumina, which distinctly improves the ability to oxidize all types of VOC compounds tested.

Example 7

Catalyst with Hydrophobic Support 10 ml of ammonium platinum nitrate aqueous solution containing 4 wt. % platinum was added to a solution containing 40 ml of distilled water and 50 ml of methanol. 3.6 g of fluorinated carbon powder (FC) was wetted with 20 ml of methanol, and was impregnated with the above solution. The resulting slurry was rotated and evaporated at about 80° C. for 22 h. The resulting dried powder was reduced in $H_2/N_2$ gas at 350° C. for 15 h.

0.1 ml of triton was added to 100 ml of distilled water. After agitating for 1.5 h, the solution was added to 0.5 g of the above obtained platinum-containing fluorinated carbon, followed by adding 49.5 g of ceramic Raschig rings (Norton, 6 mm in diameter×6 mm). The mixture was rotated and evaporated at about 80° C. for 22 h. The resulting coated ceramic rings covered with a thin film of the Pt/fluorinated carbon (about 20 mm thick) was calcined in air at 250° C. for 2 h and 350° C. for 1 h. The catalyst, designated as Pt/FCC catalyst, contained 0.1% of platinum by weight. The activity of the catalyst for benzene oxidation under both dry and humid conditions is provided in Table 8.

TABLE 8

Comparison of Activity of Pt/FCC and Pt/Alumina Catalysts for Benzene Oxidation Under Dry and Humid Conditions.

| Catalyst | Temperature, °C. | Benzene Conversion, wt. % | | Conversion Difference, | % |
| --- | --- | --- | --- | --- | --- |
| | | %C, dry[a] | %C, wet[b] | %ΔC[c] | Drop[d] |
| 0.1% Pt/ FCC | 130 | 65.9 | 56.6 | 9.3 | 14.1 |
| | 175 | 97.3 | 94.6 | 2.7 | 2.8 |
| 0.1% Pt/ alumina | 130 | 69.0 | 22.8 | 46.2 | 67.0 |
| | 175 | 98.0 | 82.2 | 13.8 | 14.1 |
| 0.045% Pt/ FCC | 130 | 44.4 | 33.7 | 10.7 | 24.1 |
| | 175 | 93.5 | 90.2 | 3.3 | 3.5 |
| 0.045% Pt/alumina | 130 | 47.4 | 12.5 | 34.9 | 73.6 |
| | 175 | 95.1 | 78.7 | 16.4 | 17.2 |

[a]Benzene conversion for dry feed.
[b]Benzene conversion for humid feed.
[c]Absolute drop in benzene conversion (%C-%$C_w$).
[d]Percentage drop [(%C-%$C_w$)/%C]•100%.

From the above results, it is seen that the benzene conversion results are directly proportional to the Pt concentration in the catalyst. Also, it is noted that an appreciable decrease in catalytic activity occurred under humid conditions as compared to dry conditions, but the decreases were less at the increased reaction temperature of 175° C. than at 130° C. temperature. The results also indicate that similar percentage conversion of benzene was achieved with the Pt on alumina support and with Pt on fluorinated carbon hydrophobic support under dry conditions. But the results clearly show the advantage of using a hydrophobic support for catalytic destruction of VOCs in the presence of water vapor, especially at relatively low temperatures. The catalyst supported on a hydrophobic material had much less loss of activity in the presence of water vapor than that supported on a hydrophilic material.

What is claimed is:

1. A catalyst composition useful for catalytic oxidative destruction of volatile organic compounds, the catalyst comprising:

an inert porous support material having total surface area of 10–400 $m^2/g$;

a transition metal oxide selected from the metals group consisting of chromium, cobalt, copper, cerium and iron provided on the porous support material in concentration of 0.5–15 wt. % of the catalyst; and an active noble metal selected from the group consisting of palladium, platinum, rhodium, and ruthenium additionally provided on said support material in concentration of 0.010–2.0 wt. % of the catalyst in a thin outer layer having thickness not exceeding about 0.10 mm; whereby at least the active noble metal exists in the thin layer on only the outer surface of the support material so as to minimize mass transfer resistance from reactant compounds and provide high catalytic activity while also minimizing the weight percent of the active metals in the catalyst.

2. The catalyst of claim 1, wherein the porous support material has total surface area of 50–350 $m^2/g$.

3. The catalyst of claim 1, wherein the support material is gamma-alumina particles having diameter of 1–10 mm.

4. The catalyst of claim 1, wherein the support material has a hydrophobic fluorinated carbon coating provided on the support material.

5. The catalyst of claim 1, wherein the active noble metal is 0.012–1.0 wt. % platinum (Pt) provided in a thin outer layer having thickness of 0.01–0.08 mm, and the transition metal oxide is 1–10 wt. % chromium oxide ($Cr_2O_3$).

6. A catalyst composition useful for catalytic oxidative destruction of volatile organic compounds, the catalyst comprising:

a particulate porous alumina support material having total surface area of 50–350 $m^2/g$;

chromium oxide ($Cr_2O_3$) provided on said porous support material in concentration of 1–10 wt. % of the catalyst, and platinum (Pt) additionally provided on said support material in concentration of 0.012–1.0 wt. % of the catalyst in only a thin outer layer having thickness of 0.01–0.08 mm;

whereby the chromium oxide and at least the platinum exist in the thin outer layer on only the outer layer of the support material, so as to minimize mass transfer resistance from reactant compounds and provide high catalytic activity while minimizing the weight percent of the active metals provided in the catalyst.

7. A method for making a catalyst useful for effective catalytic oxidative destruction of volatile organic compounds, comprising the steps of:

(a) providing an aqueous solution of chromium nitrate, adding the solution to a porous support material having surface area of 10–400 $m^2/g$, then drying and calcining the metal loaded support material;

(b) mixing ammonium platinum nitrate aqueous solution with an alcohol carrier liquid;

(c) contacting the metal loaded support material with the platinum nitrate solution so as to form clusters and limit diffusion of the platinum solution into the porous support material, and restrict the platinum to only a thin outer layer on the support material, and evaporating the carrier liquid;

(d) reducing the metal loaded support material with a hydrogen-containing gas and converting the platinum oxide to its metal state; and (e) calcining the metal loaded support material in air so as to produce the active oxidative catalyst.

8. The catalyst making method of claim 7, wherein the support material is alumina pellets having surface area of 50–350 $m^2/g$, and the alcohol carrier liquid is selected from the group including ethanol, methanol and isopropanol.

9. The catalyst making method of claim 8, wherein the ammonium platinum nitrate solution is mixed with isopropanol carrier liquid in a volume ratio of 1:3.

10. The catalyst making method of claim 8, wherein the loaded support material is dried at 50°–150° C. temperature for at least 3 hours.

11. The catalyst making method of claim 10, wherein the metals loaded support is reduced at 100°–800° C., and then calcined in air at 200°–700° C.

12. A method for making a catalyst useful for effective catalytic oxidative destruction of volatile organic compounds, comprising the steps of:

(a) providing an aqueous solution of chromium nitrate, adding the chromium nitrate solution to particles of a porous alumina support material having surface area of 10–400 $m^2/g$, and then drying and calcining the metal-loaded support material particles at temperature exceeding 50° C.;

(b) mixing ammonium platinum nitrate aqueous solution with isopropanol carrier liquid;

(c) contacting the metal loaded support material particles and the platinum nitrate solution for a time sufficient to form clusters and provide only limited diffusion of the platinum solution into the porous support material, and thereby restrict the platinum to only a thin outer layer on the support material, then evaporating the alcohol fraction carrier liquid and water at 80°–110° C. temperature;

(d) reducing the metal loaded support material particles in a hydrogen-nitrogen gas mixture at 100°–800° C. and converting the platinum to its metal state; and (e) calcining the metal loaded support material particles in air at 200°–700° C. so as to provide the active oxidative catalyst.

13. A process for catalytically oxidizing volatile organic compounds (VOCs) having a concentration of between about 1 ppm and 5 vol % in an oxygen-containing gas which is free of any catalyst poisoning material, the process comprising:

providing a feedstream containing dilute concentration of at least one volatile organic compound in gaseous form and contacting the feedstream under reaction conditions with a catalyst containing:

an inert porous support material having total surface area of 10–400 $m^2/g$, a transition metal oxide selected from the group consisting of chromium, cobalt and copper provided on the porous support material in concentration of 0.5–15 wt. % of the catalyst; and an active noble metal consisting of platinum having concentration of 0.010–2.0 wt. % of the catalyst in a thin outer layer having thickness not exceeding about 0.10 mm and in interaction with the transition metal oxide, wherein at least the active noble metal exists in the thin layer on only the outer surface of the support material so as to minimize mass transfer resistance from reactant compounds and provide high catalytic activity while also minimizing the weight percent of the active metal in the catalyst, the feedstream contacting the catalyst under reaction conditions of 50°–500° C. temperature, 0–600 psig pressure, and space velocity of 1000–200,000 $hr^{-1}$; and oxidizing the volatile organic compounds contained in the feedstream to yield essentially only carbon dioxide and water products.

14. The catalytic oxidation process of claim 13, wherein the volatile organic compound in the feedstream is selected from the group consisting of acetates, alcohols alkanes, alkenes, aldehydes, aromatics, carboxylic acids, ketones, and halogenated hydrocarbons and mixtures thereof.

15. The catalytic oxidation process of claim 13, wherein the feedstream reaction conditions are 100°–400° C. temperature, 0–100 psig pressure and space velocity of 3000–100,000 $h^{-1}$.

16. A process for catalytically oxidizing volatile organic compounds (VOCs) having a concentration of between about 1 ppm and 5 vol% in an oxygen-containing gas which is free of any catalyst poisoning material, the process comprising:

(a) providing a feedstream containing dilute concentrations of volatile organic compounds in gaseous form, and contacting the feedstream selected from the group consisting of acetates, alcohols, alkanes, alkenes, aldehydes, aromatics, carboxylic acids, ketones, halogenated hydrocarbons and mixtures thereof under reaction conditions with a catalyst containing:

an inert porous support material having total surface area of 50–300 $m^2/g$, a transition metal provided on the porous support material in concentration of 1–10 wt. % of the catalyst;

an active noble metal having concentration of 0.012–1.0 wt. % of the catalyst in a thin outer layer having thickness not exceeding about 0.10 mm and in combination with the transition metal wherein at least the active noble metal exists in the thin layer on only the outer surface of the support material so as to minimize mass transfer resistance from reactant compounds and provide high catalytic activity while also minimizing the weight percent of the active metal in the catalyst, (b) contacting the catalyst with the feedstream under reaction conditions of 100°–400° C. temperature, 0–100 psig pressure, and space velocity of 3000–100,000 $hr^{-1}$; and (c) oxidizing the volatile organic compounds contained in the feedstream to yield essentially carbon dioxide and water products.

* * * * *